United States Patent [19]
Vaughn et al.

[11] Patent Number: 5,238,077
[45] Date of Patent: Aug. 24, 1993

[54] METHOD AND APPARATUS FOR STEERING A VEHICLE

[75] Inventors: Brian K. Vaughn, Lafayette; Laurence L. Miller, West Lafayette, both of Ind.

[73] Assignee: TRW Inc., Lyndhurst, Ohio

[21] Appl. No.: 697,121

[22] Filed: May 8, 1991

Related U.S. Application Data

[62] Division of Ser. No. 370,646, Jun. 23, 1989, Pat. No. 5,076,382.

[51] Int. Cl.⁵ .............................................. B62D 5/00
[52] U.S. Cl. ...................................... 180/140; 280/91
[58] Field of Search ............... 180/132, 140, 141, 142, 180/143; 280/91

[56] References Cited

U.S. PATENT DOCUMENTS 4,856,606 8/1989 Brown .................................. 180/140
4,884,647 12/1989 Mimuro et al. .................. 180/142 X

FOREIGN PATENT DOCUMENTS 0088367 3/1990 Japan .................................. 180/140

*Primary Examiner*—Joseph D. Pape
*Attorney, Agent, or Firm*—Tarolli, Sundheim & Covell

[57] ABSTRACT

A method and apparatus are disclosed for controlling a vehicle steering system of the type having front steerable wheels and rear steerable wheels. The present invention permits the vehicle operator to select front wheel only steering, crab steering, or curl steering. If the vehicle speed is above a predetermined value, steering control is automatically switched to front wheel only steering, and the rear steerable wheels are locked in the straight-ahead direction. The lock mechanism is not actuatable until the rear steerable wheels are sensed to be within a predetermined angle of a straight-ahead direction. If the vehicle operator switches from one steering mode to another steering mode, the rear steerable wheels must return to a near straight-ahead direction before the mode will be switched. When the vehicle wheels are locked in front wheel only steering and the lock mechanism is deactuated so as to unlock the rear wheels from the vehicle frame but the rear wheels do not unlock, the present invention applies alternately driving forces to the rear steerable wheels so as to dither the wheels and free the locking mechanism. A lock mechanism is also disclosed.

11 Claims, 11 Drawing Sheets

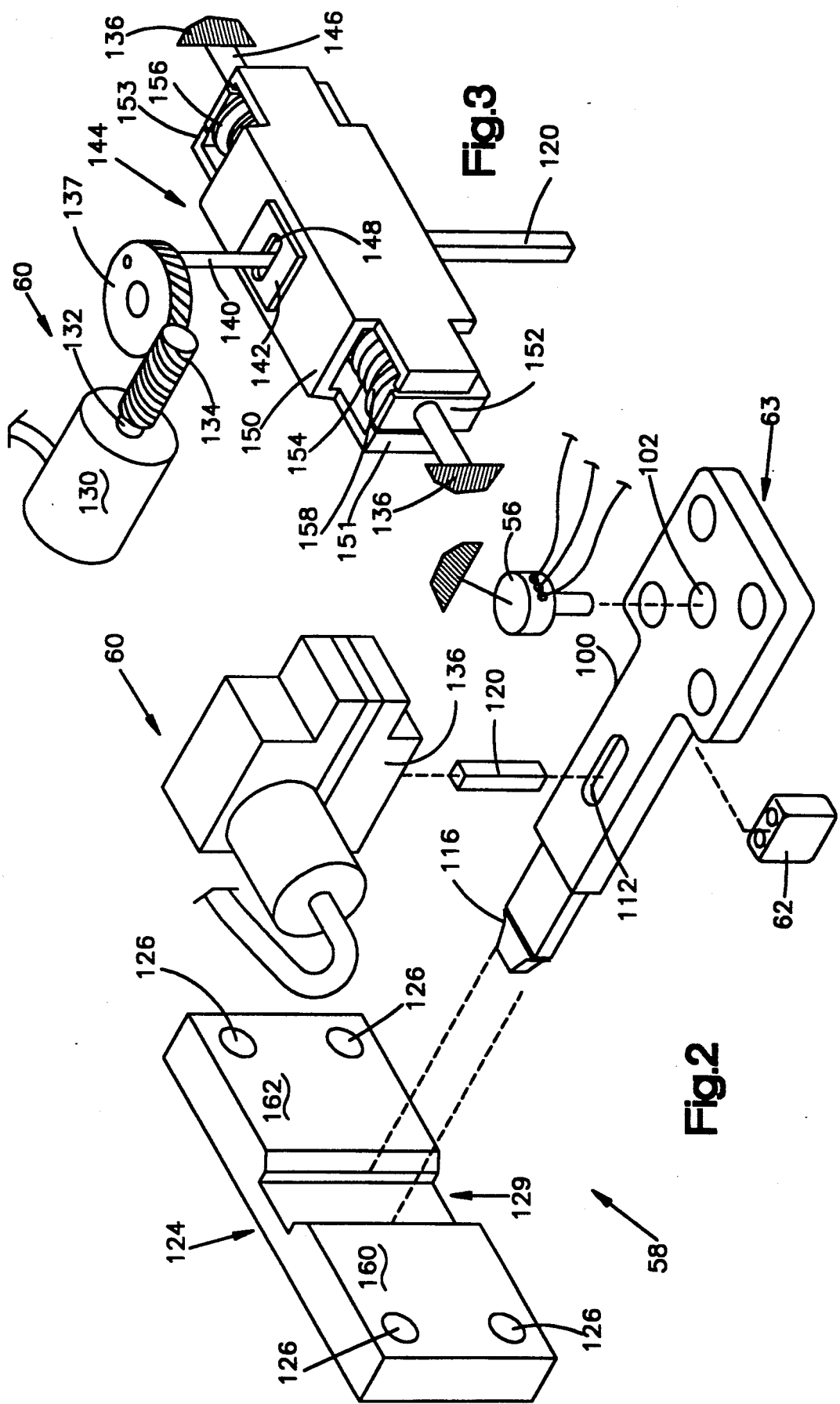

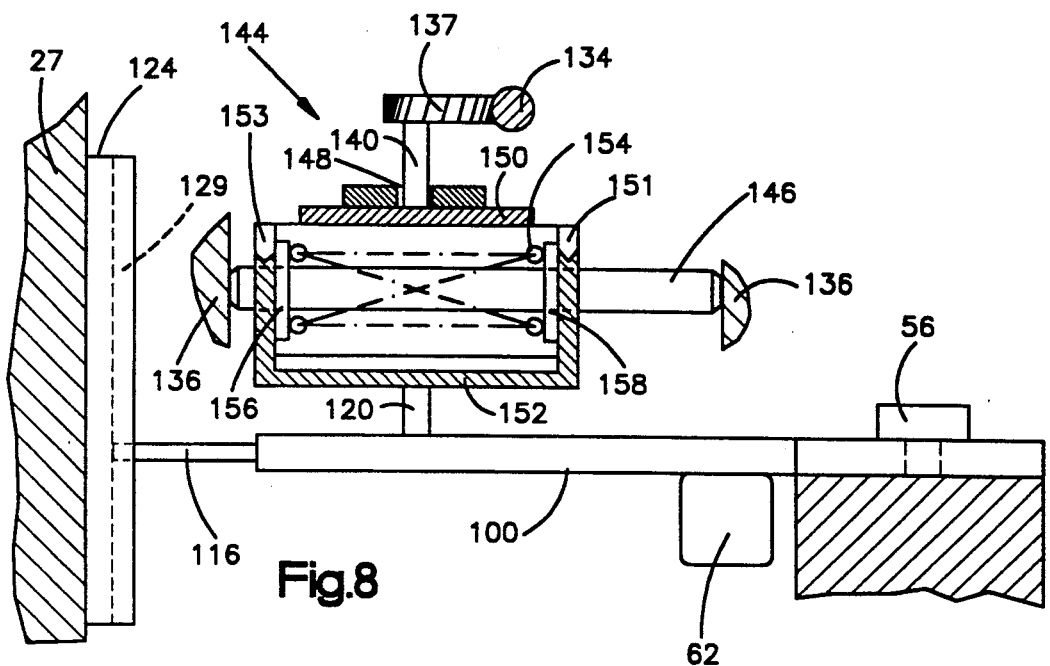
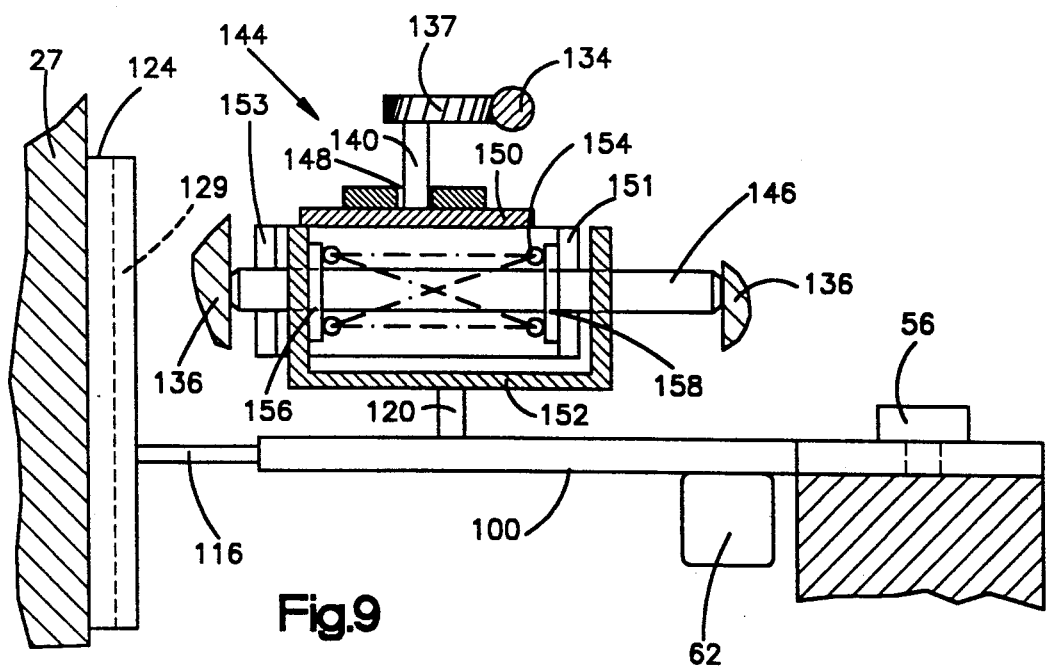

METHOD AND APPARATUS FOR STEERING A VEHICLE

This is a divisional of co-pending application Ser. No. 07/370,646 filed on Jun. 23, 1989, now U.S. Pat. No. 5,076,382.

TECHNICAL FIELD

The present invention relates to a vehicle steering system, and is particularly directed to a method and apparatus for steering a vehicle of the type having more than one set of steerable wheels.

BACKGROUND OF THE INVENTION

Vehicle steering systems having more than one set of steerable wheels are known. Typically, such a steering system includes a front set of steerable wheels and a rear set of steerable wheels, both of which are controlled in response to turning of the vehicle steering wheel. A steering system having more than one set of steerable wheels has particular suitability in a large vehicle such as a truck so as to increase steering maneuverability.

U.S. Pat. No. 4,175,638 discloses a vehicle steering system having steerable front wheels and steerable rear wheels. Turning of the front wheels and the rear wheels is controlled in response to turning of a steering wheel and position of a steering mode selector lever. The selector lever can be positioned so as to select one of a plurality of steering modes. These steering modes include (i) front wheel only steering, (ii) crab steering, (iii) curl steering (also referred to as coordinated or radiarc steering), and (iv) rear wheel only steering. During operation of the vehicle, the selector lever can be moved to effect a change in steering mode. The '638 patent further discloses a lock mechanism which, upon actuation, locks the selector lever in its present position. Although the disclosed arrangement locks the selector lever when the engine is off, it is mentioned that the lock mechanism could also be used to lock the lever in a given position while the vehicle is in operation. The '638 patent further discloses, in a second embodiment, a safety mechanism which prevents moving of a control member between more than two positions without cautioning the operator that such action is taking place.

In such a steering system, steering mode changes are made independent of vehicle speed. As such, an undesirable driving condition can result if a steering mode change occurs while the vehicle is travelling at a relatively high speed.

U.S Pat. No. 4,671,523 shows another vehicle steering system including a front set of steerable wheels and a rear set of steerable wheels. The rear set of steerable wheels includes an actuatable locking pin adapted to, in a first position, permit steerable motion of the rear set of steerable wheels and, in a second position, locks the rear set of steerable wheels in a straight-ahead direction. The pressure. The fluid pressure is functionally related to applied steering torque. The '523 patent states that ". . . steering torque is affected by a number of driving specific parameters, such as the speed of the vehicle, the friction of the road surface, the curve radius, etc." The '523 patent further states that ". . . steering of the rear wheels is eliminated by very small steering torques. Thereby, unproblematical tracking of the vehicle is ensured at high speeds or in long curves or during slightly changing steering maneuvers."

SUMMARY OF THE INVENTION

The present invention provides a new and improved method and apparatus for controlling a vehicle steering system of the type having front steerable wheels and rear steerable wheels. The steering system, in accordance with the present invention, permits the vehicle operator to select front wheel only steering, crab steering, or curl steering. The operator also selects a vehicle speed above which he desires to have the rear set of steerable wheels locked in a straight-ahead direction independent of the steering mode selected. The present invention permits a change from one steering mode to another steering mode only after the rear set of steerable wheels are in a near straight-ahead direction. Once the rear steerable wheels are to be locked in a straight-ahead direction and they come within a predetermined angle of the straight-ahead direction, they are actively steered toward the straight-ahead direction using steering motors under control of a controller. If the rear steerable wheels overshoot the straight-ahead direction upon being actively steered toward straight-ahead, the steering of the rear steerable wheels is reversed. This process is repeated until the rear steerable wheels are locked in the straight-ahead direction. If the rear steerable wheels are to be unlocked from the straight-ahead direction but do not, in fact, unlock, the rear steerable wheels are dithered using the rear steering motors until they are sensed to be unlocked.

In accordance with the present invention, a method and apparatus are provided for controlling steering of a vehicle having a front set of steerable wheels and a rear set of steerable wheels arranged in tandem. Each of the steerable wheels is steerably secured to the vehicle frame. A front steering assembly is connected to the front set of steerable wheels and to a steering wheel of the vehicle. The front steering assembly effects steering movement of the front set of steerable wheels in response to turning of the vehicle steering wheel. A controllable rear steering assembly is connected to the rear set of steerable wheels and effects steering movement of the rear set of steerable wheels in response to a rear steering control signal. Means are provided for selecting one of a plurality of steering modes including (i) front wheel only steering, (ii) crab steering, and (iii) curl steering. First sensing means are provided for sensing the steering angle of the front set of steerable wheels and for providing a signal indicative thereof. Second sensing means are provided for sensing the steering angle of the rear set of steerable wheels and for providing a signal indicative thereof. Control means are connected to said selecting means, said first sensing means, said second sensing means, and said controllable rear steering assembly for providing said rear steering control signal to effect steering movement of the rear set of steerable wheels in response to the selected steering mode and in response to the signal from said first sensing means. Said control means effects a change from one steering mode to another steering mode in response to a change in the selected steering mode only after the rear steerable wheels are sensed to be within a predetermined angle of a straight-ahead direction.

In accordance with another aspect of the present invention, a method and apparatus is provided for controlling a vehicle steering apparatus of the type having a front set of steerable wheels and a rear set of steerable wheels arranged in tandem. Each of the steerable wheels are steerably secured to the vehicle frame. A front steering assembly is connected to the front set of steerable wheels and to a steering wheel of the vehicle. The front steering assembly effects steering movement of the front set of steerable wheels in response to turning of the vehicle steering wheel. A controllable rear steering assembly is connected to the rear set of steerable wheels for effecting steering movement of the rear set of steerable wheels in response to a rear steering control signal. Means are provided for selecting one of a plurality of steering modes including (i) front wheel steering only, (ii) crab steering, and (iii) curl steering. First sensing means are provided for sensing the steering angle of the front set of steerable wheels and for providing a signal indicative thereof. Second sensing means are provided for sensing the steering angle of the rear set of steerable wheels and for providing a signal indicative thereof. Third sensing means is provided for sensing speed of the vehicle and providing a signal indicative thereof. Actuatable locking means are connected to the vehicle frame and to the rear set of steerable wheels for, when actuated and when said rear set of steerable wheels is in a straight-ahead direction, locking said rear set of steerable wheels in the straight-ahead direction. Data input means are provided and accessible to and operable by an operator of the vehicle for establishing a rear wheel steering lock speed value. Control means is connected to said first, second, and third sensing means, said steering mode selecting means, said actuatable locking means, said data input means, and said controllable rear steering assembly for controlling the steering of the rear set of steerable wheels in response to the selected steering mode and in response to the signal from said first sensing means. Said control means actuates said locking means when the sensed vehicle speed is greater than the established rear wheel steering lock speed value.

In accordance with a preferred embodiment, the steering system further includes lock sensing means for sensing if, upon actuation of the locking means, the locking means has locked the rear set of steerable wheels to the vehicle frame and for providing a signal indicative thereof. The control means, after actuating said locking means and sensing said locking means has not steerably locked said rear set of steerable wheels to the vehicle frame, providing said rear steering assembly with said rear steering control signal so as to steer the rear steerable wheels toward a straight-ahead direction. The control means effects a reversal of the steering direction of the rear steerable wheels by said rear steering control signal if said rear set of steerable wheels are sensed to have passed the straight-ahead direction and the locking means is sensed to have not locked said rear set of steerable wheels in a straight-ahead direction.

Further, in accordance with a preferred embodiment, the control means deactuates said locking means after sensed vehicle speed decreases below a second predetermined value less than the predetermined value used by the control means to actuate the locking means. Lock sensing means are provided for sensing if, upon deactuation of said locking means, said locking means has unlocked said rear set of steerable wheels from the vehicle frame and for providing a signal indicative thereof. After said control means deactuates said locking means and said lock sensing means indicates that said locking means has not unlocked said rear set of steerable wheels from the vehicle frame, said control means provides said rear steering assembly with said rear steering control signal for a predetermined time period. This process is repeated in alternate directions until the locking means is sensed to be unlocked. This process is referred to as dithering.

BRIEF DESCRIPTION OF THE DRAWINGS

Further features and advantages of the present invention will become apparent to those skilled in the art upon reading the detailed description with reference to the accompanying drawings, in which:

FIG. 2 is an exploded perspective view of a portion of the steering system of FIG. 1 showing a rear wheel lock mechanism;

FIG. 3 is a schematic perspective view of a portion of the rear wheel lock mechanism shown in FIG. 2;

FIG. 8 is a view similar to FIG. 7 with the rear wheel lock mechanism shown in a locked position;

FIG. 9 is a view similar to FIG. 7 with the rear wheel lock mechanism shown as being biased toward a locked position;

DETAILED DESCRIPTION OF THE PREFERRED EMBODIMENT

Figure 1:
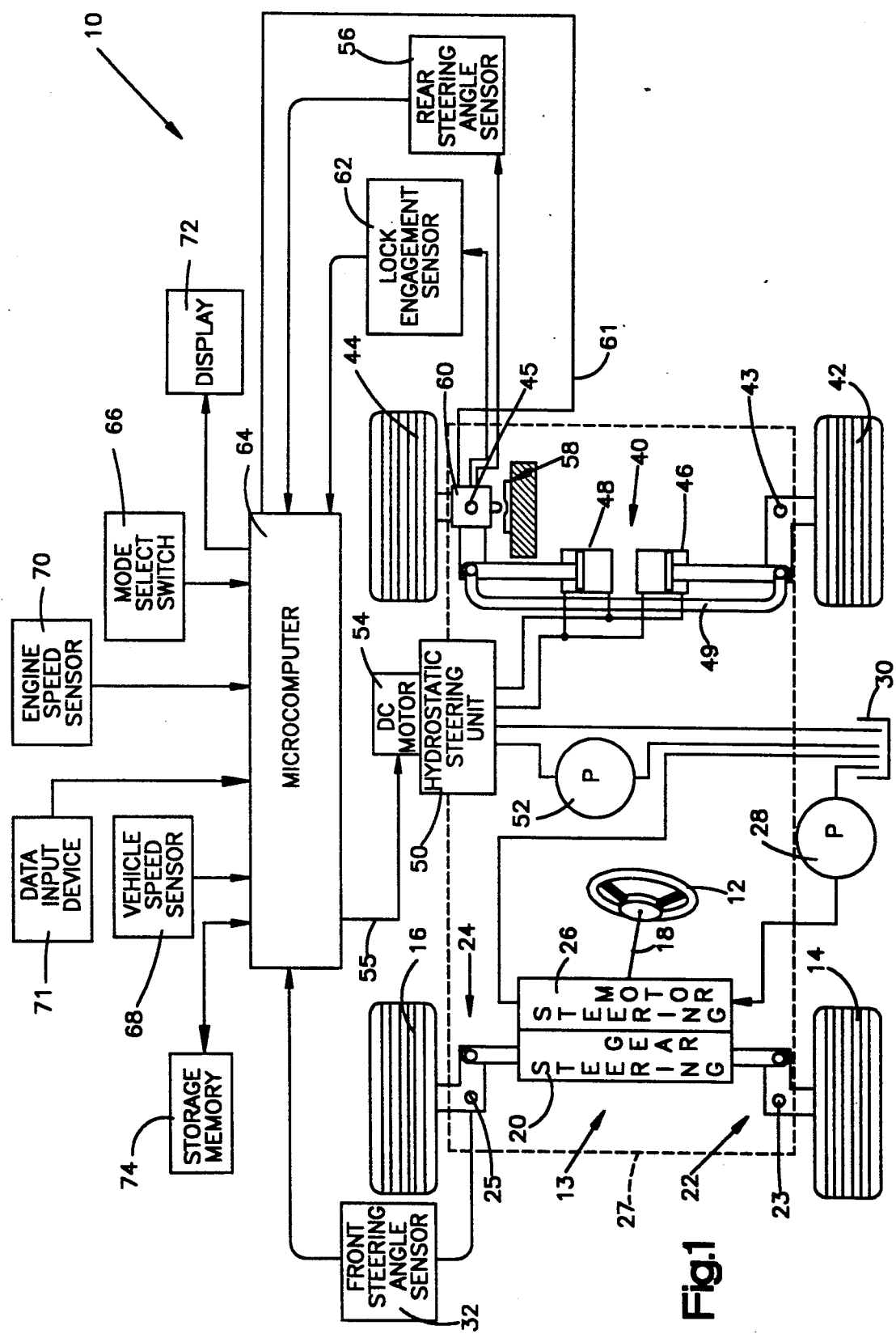
FIG. 1 is a schematic block diagram of a vehicle steering system made in accordance with the present invention.
Figure 4:
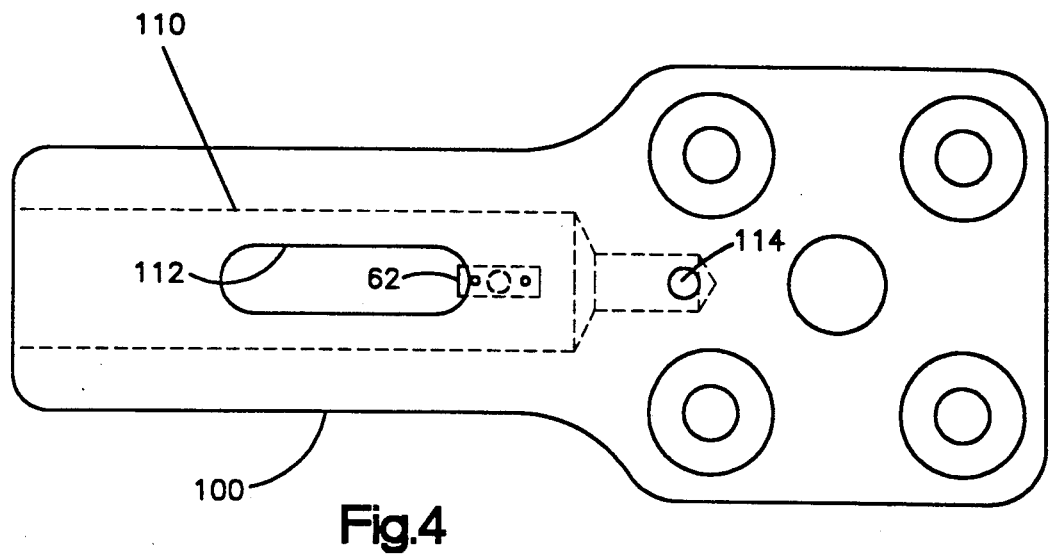
FIG. 4 is a top plan view of a portion of the rear wheel lock mechanism shown in FIG. 2.
Figure 5:
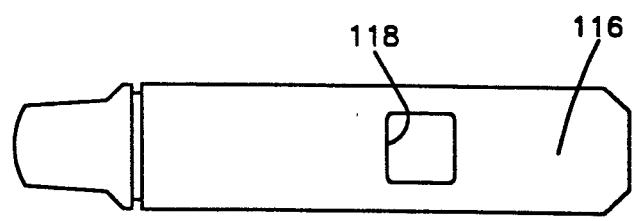
FIG. 5 is a top plan view of a portion of the rear wheel lock mechanism shown in FIG. 2.
Figure 6:
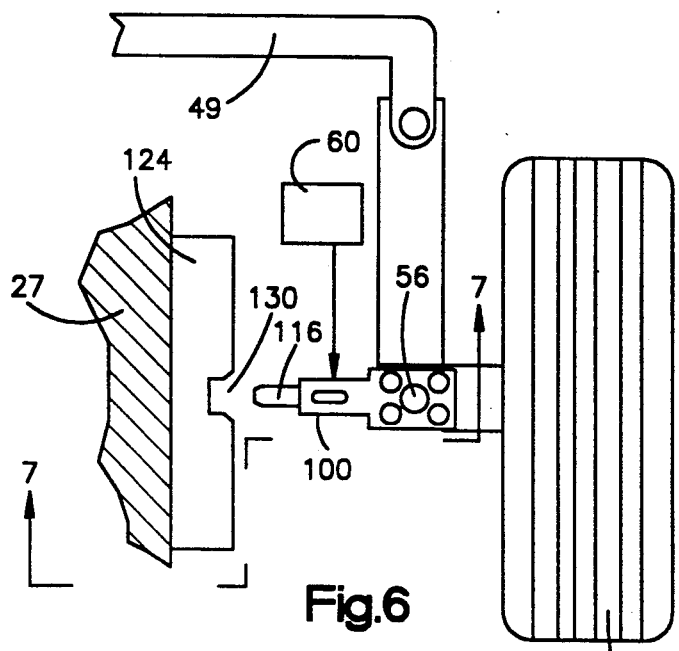
FIG. 6 is a schematic block diagram of a portion of the vehicle steering system of FIG. 1 showing further details of the rear wheel lock mechanism.

Referring to FIG. 1, a vehicle steering system 10, made in accordance with the present invention, includes a steering wheel 12 operatively connected to a front steering assembly 13. The front steering assembly 13 includes front steerable wheels 14, 16 connected to the steering wheel 12 through an input shaft 18, a front steering gear 20, and appropriate steering linkages 22, 24. The front steerable wheels 14, 16 are pivotably mounted on king pins 23, 25, respectively, the king pins being supported by the vehicle frame 27.

The front steering assembly 13 further includes a hydraulic, power assist steering motor 26 connected in fluid communication with a first hydraulic pump 28 and a fluid reservoir 30. The steering motor 26 is operatively connected between the steering wheel 12 and the steerable wheels 14, 16 and can be any Of several types known in the art which provides power assist to aid the vehicle operator in turning the front steerable wheels 14, 16 upon application of steering torque to the vehicle steering wheel 12.

A front steering angle sensor 32 senses the steering angle of the front steerable wheels 14, 16 relative to a straight-ahead direction and provides an electrical signal indicative thereof. Such a steering angle sensor is known in the art and is therefore not described herein in detail. One type of steering angle sensor contemplated is a potentiometer having one portion connected to the vehicle frame 27 and a second portion connected to a portion of the steering linkage that pivots with the front steerable wheels 14, 16. Upon pivotal movement of the front steerable wheels 14, 16, the impedance of the potentiometer varies as a function of their steering angle.

An actuatable rear steering assembly 40 includes rear steerable wheels 42, 44 mounted in tandem behind the front steerable wheels 14, 16 and mounted so as to pivot about king pins 43, 45, respectively, the king pins being supported by the vehicle frame 27. The rear steering assembly 40 further includes a pair of hydraulic steering motors 46, 48 operatively connected to the rear steerable wheels 42, 44, respectively, through appropriate steering linkage. A tie rod 49 steerably connects the two rear steerable wheels 42, 44 together.

A hydrostatic steering unit 50 is connected in fluid communication with the hydraulic steering motors 46, 48, the fluid reservoir 30, and a second hydraulic pump 52. A DC electric motor 54 is drivingly connected to the hydrostatic steering unit 50. The rate and direction of fluid to the pair of hydraulic steering motors 46, 48 varies as a function of the speed and direction of rotation of the output shaft of the DC motor 54. The DC motor 54 is controlled, i.e. speed and direction of motor operation, by an input signal 55. A detailed description of the hydrostatic steering unit 50 and the DC motor 54 is fully described in a patent application of Laurence L. Miller entitled "Vehicle Steering System", assigned to the assignee of the subject application, and filed Apr. 25, 1989, now U.S. Pat. No. 4,972,916, the entire specification of which is hereby fully incorporated herein by reference.

A rear steering angle sensor 56 senses the steering angle of the rear steerable wheels 42, 44 relative to a straight-ahead direction and provides an electrical signal indicative thereof. Any of several types of steering angle sensors can be used for the rear steering angle sensor 56. One type of sensor contemplated includes a potentiometer having one portion secured to the vehicle frame 27 and a second portion secured to the part of the rear wheel assembly 40 that pivots about the king pin 45 commensurate with steering movement of the rear steerable wheels 42, 44. The impedance of the potentiometer varies as a function of the steering angle of the rear steerable wheels.

An actuatable lock mechanism 58 is operatively secured to the pivotal portion connected to the rear steerable wheel 44 and the vehicle frame 27. The lock mechanism 58 includes a lock actuator 60. When the lock mechanism 58 is actuated and the rear wheels 42, 44 are in a straight-ahead direction, the lock mechanism 58 locks the rear steerable wheels 42, 44 in the straight-ahead direction. When the lock mechanism 58 is not actuated, the rear steerable wheels 42, 44 can be steered through use of the hydraulic motors 46, 48. The lock actuator 60 is controlled by a control signal 61. A lock engagement sensor 62, operatively coupled to the lock mechanism 58, senses the condition of the lock mechanism 58 and provides an electrical signal indicative of whether or not the lock mechanism is locked, i.e, the rear steerable wheels are locked in the straight-ahead direction.

A microcomputer 64 is connected to the output of the front steering angle sensor 32, the rear steering angle sensor 56, the lock engagement sensor 62, the lock actuator 60 and the DC motor 54. The microcomputer 64 outputs the control signals 55 and 61 in accordance with a preprogrammed procedure stored in an internal memory of the microcomputer 64. Microcomputers are readily available in the commercial market. Their internal structure and operation are well known in the art and, therefore, are not described in detail herein.

A steering mode select switch 66 is connected to the microcomputer 64 and is used for selecting one of a plurality of different steering modes. The mode selector switch 66 is preferably located in the vehicle passenger compartment for easy access by the vehicle operator. Three steering modes can be selected through the mode select switch including (i) front wheel only steering, (ii) crab steering, or (iii) curl steering. Curl steering is also referred to in the art as coordinated or radiarc steering.

In the front wheel only steering mode, the microcomputer 64 outputs appropriate control signals so as to lock the rear steerable wheels 42, 44 in a straight-ahead direction, steering of the vehicle being accomplished only through the front steerable wheels 14, 16. In the crab steering mode, the microcomputer 64 outputs the appropriate control signals so as to turn the rear steerable wheels 42, 44 in the same direction as the front steerable wheels 14, 16 are sensed to have turned. In the curl steering mode, the microcomputer 64 outputs appropriate control signals so that the rear steerable wheels 42, 44 turn in a direction opposite from the direction the front steerable wheels 14, 16 are sensed to have turned.

A vehicle speed sensor 68 senses the ground speed of the vehicle and provides an electrical signal indicative thereof to the microcomputer 64. An engine speed sensor 70 senses the number of revolutions per minute of the vehicle engine ("engine RPM") and provides an electrical signal indicative thereof to the microcomputer 64. The vehicle speed sensor 68 and the engine speed sensor 70 are of conventional design and are therefore not described in detail herein.

The microcomputer 64 monitors the different electrical signals from the front steering angle sensor 32, the rear steering angle sensor 56, the locking engagement sensor 62, the mode select switch 66, the vehicle speed sensor 68, and the engine speed sensor 70. A data input device 71 is connected to the microcomputer 64 and is located in the vehicle compartment for easy access by the vehicle operator. The data input device is used to establish certain control values which, in turn, are used to control operation of the steering system. The data input device 71 can be embodied in any of several different forms. In a preferred embodiment, the data input device is a keyboard of the type well known in the art.

A display 72 is connected to an output of the microcomputer 64 and provides a means for visual communication from the microcomputer 64 to the vehicle operator so as to inform the operator which steering mode has been selected, the current operating mode, and the relative steering angles between the front steerable wheels 14, 16 and the rear steerable wheels 42, 44. The display 72 is also used to prompt the vehicle operator to enter information through the data input device 71 so as to establish the certain control values. The control values include a rear wheel steering lock speed value, a rear wheel steering unlock speed value, a rear steering angle to front steering angle ratio for the crab and curl steering modes, and maximum rear wheel steering angle value. The steering angle ratios for crab and curl steering modes may be different. It is further contemplated that the rear wheel steering unlock speed value may be fixed as a function of the rear wheel steering lock speed value. It should be appreciated that the unlock speed value must be less than the lock speed value to provide proper system hysteresis. The maximum value which can be selected for the maximum rear wheel steering angle value is determined by the maximum angular travel of the rear steerable wheels. This is preferably a preprogrammed value.

The rear wheel steering lock speed value is that vehicle speed at which, when reached, the microcomputer provides an appropriate control signal to actuate the lock mechanism 58 so as to prevent any further steering movement of the rear steerable wheels. Once the lock mechanism 58 is actuated because the vehicle speed has exceeded the rear wheel steering lock speed value, the lock mechanism is not deactuated until the vehicle speed becomes less than the established rear wheel steering unlock speed value. The unlock speed value is less than the lock speed value so as to provide system hysteresis.

The front-to-rear steering angle ratio value is used by the microcomputer 64 to control the ratio of the steering angle between the front steerable wheels 14, 16 and the rear steerable wheels 42, 44 during the crab and the curl steering modes. A storage memory 74 is provided for storing the data values entered through the data input device 71. Although the storage memory 74 is shown as a separate memory device externally connected to the microcomputer 64, those skilled in the art will appreciate that the storage of data from the data input device could be accomplished by using an internal memory of the microcomputer.

In response to the monitored electrical signals from the different sensors and the mode select switch 66, the microcomputer 64 (i) determines the desired steering mode, (ii) provides an output signal 61 to control locking and unlocking of the locking mechanism 58, (iii) determines the desired rear steering angle, if any, and (iv) generates the second signal 55, if required, to control steering movement of the rear steerable wheels 42, 44 in accordance with the desired steering angle. The microcomputer 64 is preprogrammed to provide appropriate control signals so that the vehicle will steer in accordance with the selection made through the mode select switch 66 and in accordance with certain other operating criteria. If the vehicle operator changes the steering mode to either the crab mode or the curl mode and the vehicle speed is below the rear wheel lock speed threshold value stored in the memory 74, the microcomputer 64 outputs appropriate control signals so as to change to the selected steering mode but only after the rear wheels 42, 44 are sensed to be in a substantially straight-ahead direction.

Independent of the steering mode selected, the microcomputer 64 locks the rear steerable wheels 42, 44 in a straight-ahead direction once the rear wheel lock speed threshold value has been reached or exceeded by the vehicle and the rear steerable wheels have returned to a straight-ahead direction. If the vehicle operator attempts to select either the crab mode or the curl mode or to change the selected steering mode to either the crab mode or the curl mode and the vehicle has reached or exceeded the rear wheel lock speed threshold value, the steering mode change is not effected until the rear steerable wheels 42, 44 are in a straight-ahead direction and the vehicle speed has decreased below the rear wheel unlock speed threshold value.

Referring to FIGS. 2-9, the locking mechanism 58 will be better appreciated. The locking mechanism 58 includes a support member 100 secured to a spindle portion of one of the rear steerable wheels 42, 44 in a manner so that a hole 102 in the support member 100 is centered over the pivot point or king pin for that wheel. The rear steering angle sensor 56, in the form of a potentiometer, is received into the hole 102 so that a bottom portion is mechanically coupled to the support member 100 and a top portion is mechanically coupled to the vehicle frame. Pivotal motion of the rear steerable wheels 42, 44 causes relative rotation to occur between the bottom portion and the top portion of the steering angle sensor 56 thereby varying the impedance of the potentiometer.

The support member 100 includes a bore 110 extending part way through the support member 100. An elongated opening 112 is centrally aligned with the bore 110. An air hole 114 is located near an end of bore 110 and is perpendicular thereto so as to communicate the end of bore 110 with the atmosphere. Preferably, a check valve would be located in the hole 114 so as to let air out of the bore 110 and not let air, water or other contaminant into the bore.

A locking pin 116 is slidably received into the bore 110 of the support member 100. The locking pin 116 includes a square hole 118 positioned on the locking pin 116 so that when the locking pin 116 is received in the bore 110, the hole 118 aligns with the elongated opening 112 in the support member 100. The air hole 114 permits locking pin 116 to slide unimpeded in bore 110. A drive pin 120 is operatively connected to the lock actuator 60 and is received in the opening 118 of the locking pin 116. The actuator 60, in response to the control signal 61, moves the pin 120 along the opening 112 so as to move the locking pin 116 inward and outward of the support member 100.

A latching block 124 is secured to a portion of the frame 27 of the vehicle preferably by bolts extending through bolt holes 126 and threadably received in associated threaded bores in the vehicle frame. The latching block 124 includes a groove 129 arranged so as to receive the locking pin 116 when the locking pin is extended and the rear steerable wheels are in a straight-ahead direction. The end portion of the locking pin 116 and the groove 129 are tapered in a manner so as to prevent the pin 116 from binding in the groove 129 when the pin is received in groove 129 and steering torque is applied to the rear steerable wheels 42, 44.

The lock actuator 60 is secured to the support member 100 in an appropriate manner, such as by bolts, welding, etc. The lock actuator 60 includes a DC motor 130 having a drive shaft 132 and a worm gear 134. The motor 130 is secured to a housing 136 so as to permit rotary motion of the worm gear 134 upon energization of the DC motor 130. The worm gear 134 is drivably connected to a worm wheel 137 mounted for rotation within the housing 136. A drive pin 140 is secured to the worm wheel 137 at a location eccentric of the axis of the worm wheel 137. The motor 130 is arranged so as to rotate the worm wheel 137 180° counterclockwise or 180° clockwise from a centered position.

The drive pin 140 is operatively received in a slotted opening 148 of a connection plate 142 which is, in turn, secured to a linear actuator 144. The linear actuator 144 includes a guide pin 146 that extends to opposite wall surfaces of the housing 136. As the motor 130 drives the worm wheel 137 into rotation counterclockwise and clockwise, the linear actuator 144 is driven so as to slide left and right on the given pin 146 by force of the pin 140 against the slot in the connection plate 142. It will be appreciated that the slot 148 in the receiving plate 142 is elongated so as to permit the pin 140 to slide as it drives the linear actuator 144 leftward and rightward along the guide pin 146.

The linear actuator 144 includes an upper member 150 and a lower member 152 which are mounted in a manner which permits relative sliding motion therebetween. The upper member 150 has a pair of end flanges 151 at one end and a pair of end flanges 153 at the other end. A spring 154 is received in an opening between the upper member 150 and lower member 152 and includes washers 156, 158, one located at each end of the spring 154. Each of the washers 156, 158 has a diameter larger than the distance between the ends of the associated pair of end flanges 151, 153 of the upper member 150. The washers 156, 158 retain the spring 154 within the upper member 150. As will be appreciated, the spring 154 biases the upper member 150 and the lower member 152 in an aligned orientation as shown in FIG. 3. The square pin 120 is secured to the bottom member 152 in an appropriate manner. Linear motion of the actuator 144 along the guide pin 146 results in linear movement of the locking pin 116 in both directions of the bore 110.

Figure 7:
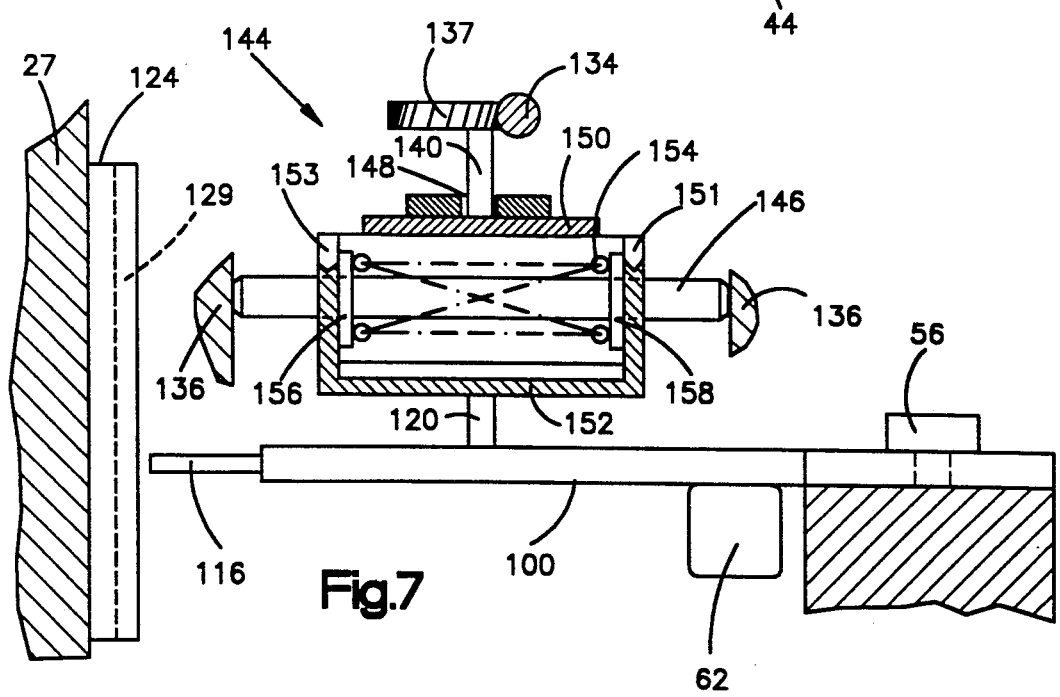
FIG. 7 is an enlarged view taken along line 7—7 of FIG. 6 showing the rear wheel lock mechanism in an unlocked position.

Referring to FIG. 7, the lock mechanism is shown in an unlocked position. The spring 154 biases the upper member 150 and the bottom member 152 toward an aligned position. When the pin 140 is in a position closest to the wheel 44, the locking pin 116 is furthest away from the latching block 124.

Referring to FIG. 8, the locking mechanism is shown in a locked position. The upper member 150 and lower member 152 are driven toward the latching block 124. If the wheel 44 is in a straight-ahead direction, the locking pin 116 is received in groove 129 thereby locking the wheels 42, 44 in the straight-ahead direction. The spring bias force provided by spring 154 biases the lower member 152 to follow the upper member 150 as the motor 130 drives the pin 140 toward the latching block 124. In the locked position, the motor 130 has driven the worm wheel 137 so that the pin 140 is positioned farthest away from the wheel 44.

Referring to FIG. 9, the locking mechanism is shown biased toward a locked position. In FIG. 9, the rear wheel 44 is not in the straight-ahead direction when the motor 130 attempts to drive the linear actuator 144 toward the locked position. Upon such occurrence, the locking pin 116 is not in alignment with the groove 129 of the latching block 124. The motor 130 drives the worm wheel 137 thereby driving the upper member 150 through pin 140 toward the block 124. When the locking pin 116 contacts one of a pair of land surface 160, 162 of the latching block 124, further movement of the lower member 152 is stopped. Upon such occurrence, the upper member 150 and the lower member 152 slide relative to each other along the guide pin 146 thereby compressing the spring 154 between the washers 156, 158. If the linear actuator 144 is left in the position shown in FIG. 9, the locking pin 116 will lock the wheels 44, 46 in the straight-ahead direction after the wheels 44, 46 return or are driven to a straight-ahead direction.

The lock engagement sensor 62 is mounted to the bottom of the support member 100 in an appropriate manner, preferably by bolts. The sensor 62 is aligned at a location near the inward end of the bore 110 such that when the pin 116 is retracted into the support member 100 by an amount sufficient to insure the pin 116 would not be received in groove 129, the inward end of the pin 116 overlies the location of the lock engagement sensor 62. It is preferred that the lock engagement sensor 62 be a microswitch having a ball or an arm that extends into the bore 110. As the locking pin 116 is slid inward into the support member 100, the pin 116 depresses the ball or arm lever of the switch thereby actuating the switch. The microcomputer 64 monitors whether or not the switch is closed or open thereby detecting whether or not the pin 116 is in a locked or unlocked position, i.e., the pin 116 is in or out of groove 129.

Figure 10A:
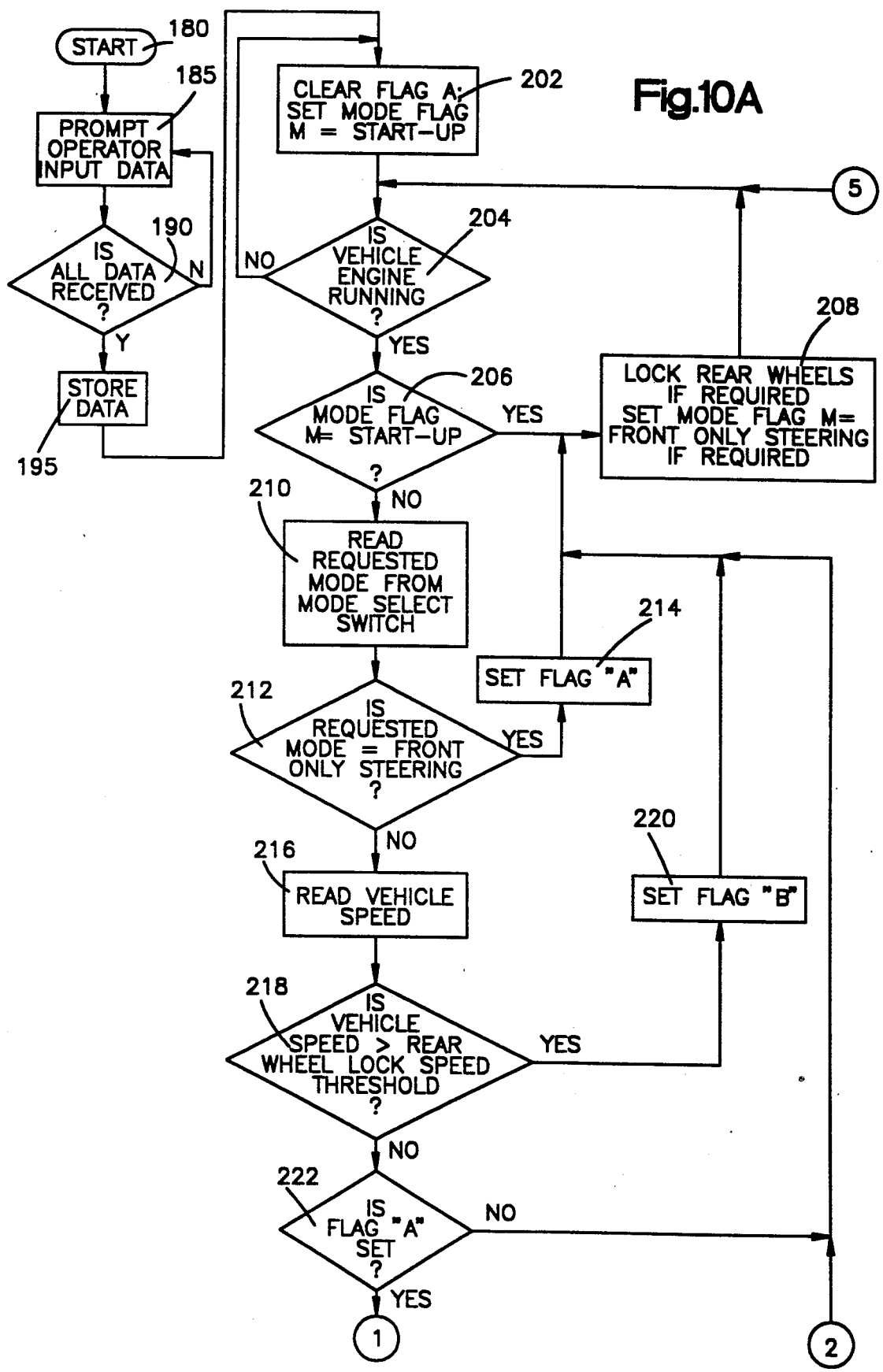
FIGS. 10A through 10C show flow charts depicting the control procedure followed by a microcomputer shown in FIG. 1.
Figure 10B:
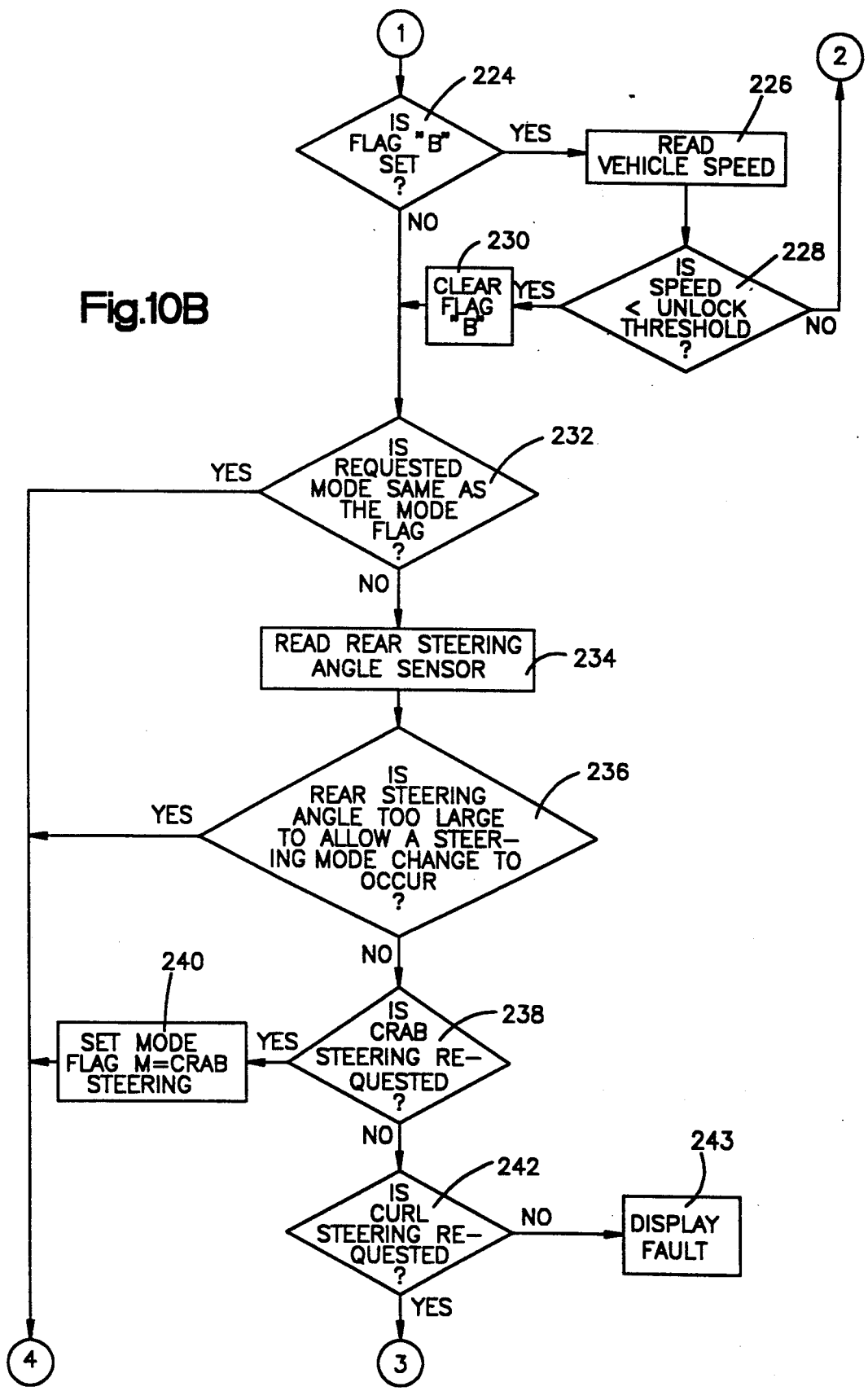
Figure 10C:
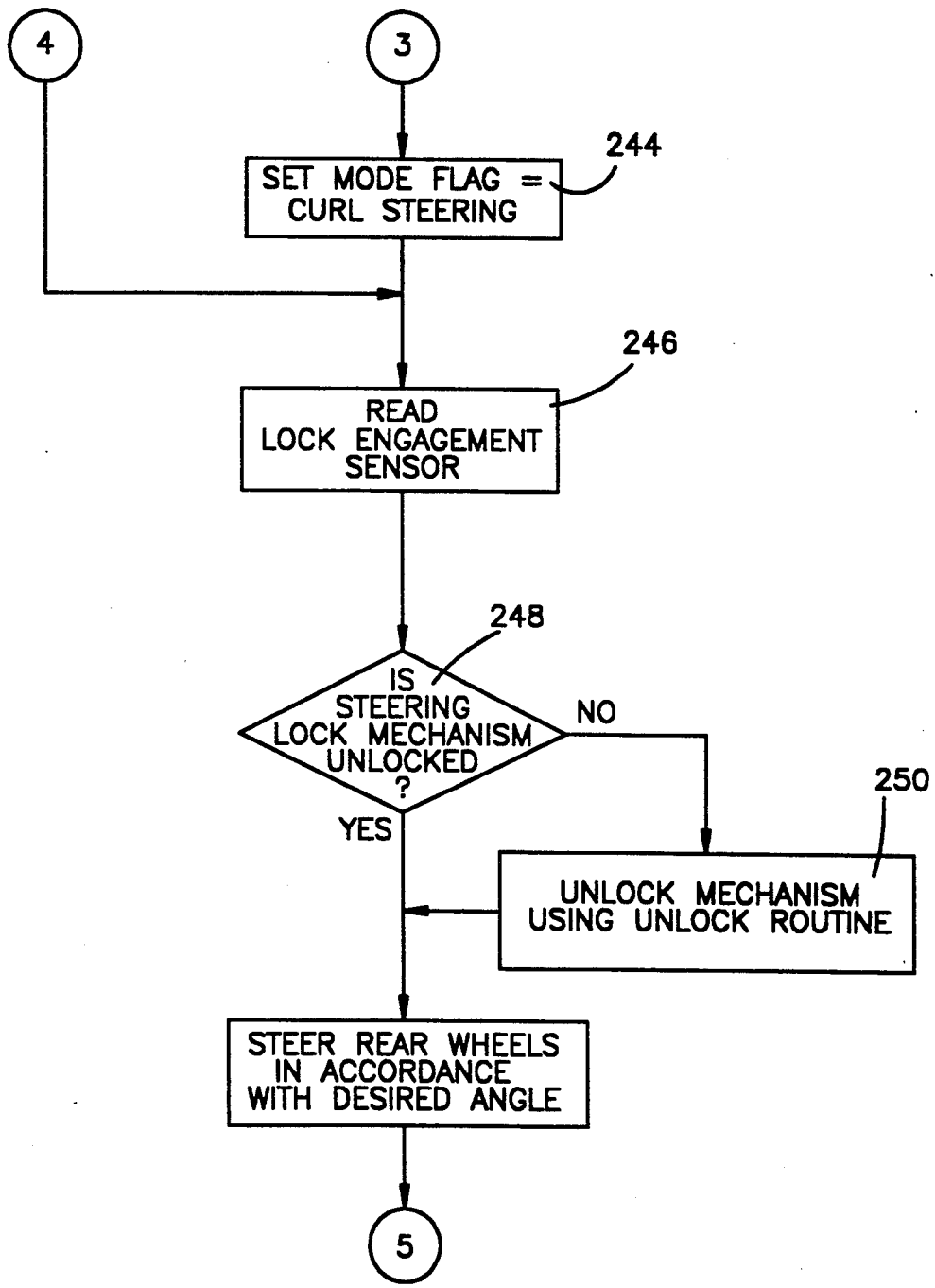

Referring to the flowcharts shown in FIGS. 10A-10C, the procedure for controlling steering mode in accordance with the present invention will be better understood. The microcomputer 64 carries out this procedure by following an internal program. The microcomputer 64 continuously cycles through this steering mode program to determine if a steering mode change is required and, if necessary, make the required change.

The steering mode control program begins in step 180 when electrical power is first applied to the microcomputer and associated circuitry. In step 180, microcomputer internal functions are initialized in a manner well known in the art. In step 185, the microcomputer 64 prompts the vehicle operator through the display 72 to enter control data including the rear wheel steering lock speed value and the front to rear steering ratio for the crab and the curl steering modes. This assumes a system in which the unlock speed value is functionally related to the lock speed value and that maximum rear wheel steering angle is preset for the vehicle upon which the system is installed. The absolute value of the steering angle ratio can be the same for the curl and crab steering modes or different ratios can be used for curl and crab steering modes. The program proceeds to step 190 where a determination is made as to whether all data has been received by the microcomputer 64. If the determination is negative, the program returns to step 185. The operator prompt continues until the determination in step 190 is affirmative. The program proceeds from an affirmative determination in step 190 to step 195 where the received data is stored for subsequent use. The program then proceeds to step 202.

In step 202, a flag A, i.e., a particular memory location in the microcomputer 64, is cleared and a steering mode flag M, i.e., another particular memory location in the microcomputer 64, is initially set to "start-up mode." The program then proceeds to step 204 where a determination is made as to whether the vehicle engine is running. This is determined by monitoring the engine rpm sensor 70. If the determination in step 204 is negative, the program loops back to step 202. If the determination in step 204 is affirmative, the program proceeds to step 206.

In step 206, a determination is made as to whether the mode flag M is set to the start-up mode. If the determination in step 206 is affirmative, the program proceeds to step 208. In step 208, the microcomputer 64 provides the output signal 61 to actuate the lock mechanism 58.

The steering mode flag M is set to the front wheel only steering mode. The program then returns through step 204 to step 206. Since the mode flag M is now set to the front wheel only steering mode, the program proceeds from step 206 to step 210.

In step 210, the microcomputer 64 reads the mode select switch 66. The program then proceeds to step 212 to determine if the steering mode selected on the mode select switch 66 is the front wheel only steering mode. If the determination in step 212 is affirmative, then the flag A is set in step 214. The program then proceeds to step 208. Since the lock mechanism 58 is already actuated and the steering mode flag M is already set to the front wheel only steering mode, the program simply loops back to step 204. If the determination in step 212 is negative, the program proceeds to step 216.

In step 216, the microcomputer 64 reads the vehicle speed from the vehicle speed sensor 68. The program then proceeds to step 218. In step 218, the value of the preset vehicle speed, as determined from the vehicle speed sensor 68, is compared with the rear wheel lock speed threshold value stored in the memory 74. If the vehicle speed is greater than the rear wheel lock speed threshold value, the program proceeds to step 220. In step 220, a flag B, i.e., another particular memory location in microcomputer 64, is set to indicate that the vehicle speed has exceeded the rear wheel lock speed threshold value. After the flag B is set, the program proceeds back to step 208 to actuate the lock mechanism 58 if required and to set the mode flag M to the front wheel only steering mode if required. Thus, when the vehicle speed exceeds the rear wheel lock speed threshold value, the lock mechanism 58 is actuated to prevent turning of the rear wheels 42, 44 independent of what steering mode has been selected.

If the determination in step 218 is negative, the program proceeds to step 222. In step 222, a determination is made as to whether the flag A is set. If the determination in step 222 is in the negative, the program proceeds to step 208 to actuate the lock mechanism 58 if required and to set the steering mode flag M to the front wheel only steering mode if required. Flag A can only be set through step 214 when the front wheel only steering mode has been selected as determined by step 212. Thus, step 222 insures that mode select switch 66 is initially set to the front wheel only steering mode before the program can get out of the above-described loop. Once the mode select switch 66 is set to the front wheel only steering mode, the program will remain in a loop including steps 212, 214, 208, 204, 206, and 210 until the mode select switch 66 is changed from the front wheel only steering mode to either the curl steering mode or the crab steering mode.

When the determination in step 222 is affirmative, the program proceeds to step 224. In step 224, a determination is made as to whether the flag B is set. If the determination in step 224 is affirmative, the program proceeds to step 226. In step 226, the microcomputer 64 reads the vehicle speed from the vehicle speed sensor 68. The program then proceeds to step 228. If the vehicle speed is not less than the rear wheel unlock speed threshold value stored in memory 74, the program loops back to step 208. This insures that the steering mode cannot be released from the front wheel only steering mode until the vehicle speed is less than the unlock speed threshold value. If the determination in step 228 is affirmative, the program proceeds to step 230 where the flag B is cleared. The program proceeds to step 232 from step 230 or from a negative determination in step 224.

In step 232, a determination is made as to whether the steering mode selected on the mode select switch 66 is the same as is set in the steering mode flag M. If the determination in step 232 is negative, the program proceeds to step 234. In step 234, the microcomputer 64 reads the rear steering angle sensor 56 and the program proceeds to step 236. In step 236, a determination is made as to whether the rear steering angle as sensed by sensor 56 is too large to allow a steering mode change to occur. The rear steering angle value used in step 236 can either be a value programmed in the microcomputer or can be an operator entered value prompted in step 185 and subsequently stored in memory. The purpose of step 236 is to insure vehicle stability during changes in steering mode.

If the determination in step 236 is in the negative, the program proceeds to step 238. In step 238, a determination is made as to whether the crab steering mode has been selected. If the determination in step 238 is affirmative, the steering mode flag M is set to the crab steering mode in step 240. If the determination in step 238 is negative, the program proceeds to step 242 where a determination is made as to whether the curl steering mode has been selected. If the determination in step 242 is affirmative, the program proceeds to step 244 where the steering mode flag M is set to the curl steering mode. If the determination in step 242 is negative, the program proceeds to step 243 where a fault indication is provided through the display 72. Upon determination of a fault condition, the lock mechanism is actuated so as to lock the rear steerable wheels in a straight-ahead direction and the steering mode is selected to be front wheel steering only.

The program proceeds either from an affirmative determination in step 232 or in step 236, from step 240, or from step 244 to step 246. In step 246, the microcomputer 64 reads the lock engagement sensor 62. The program proceeds to step 248 where a determination is made as to whether the lock mechanism 58 is unlocked. If the determination is negative, the program proceeds to step 250. In step 250, the lock mechanism 58 is unlocked using an unlock routine. The program proceeds from an affirmative determination in step 248 or from step 250 to step 251. In step 251, the microcomputer 64 outputs the appropriate control signals to steer the rear steerable wheels in accordance with the desired steering angle. The program then proceeds back to step 204.

Figure 11:
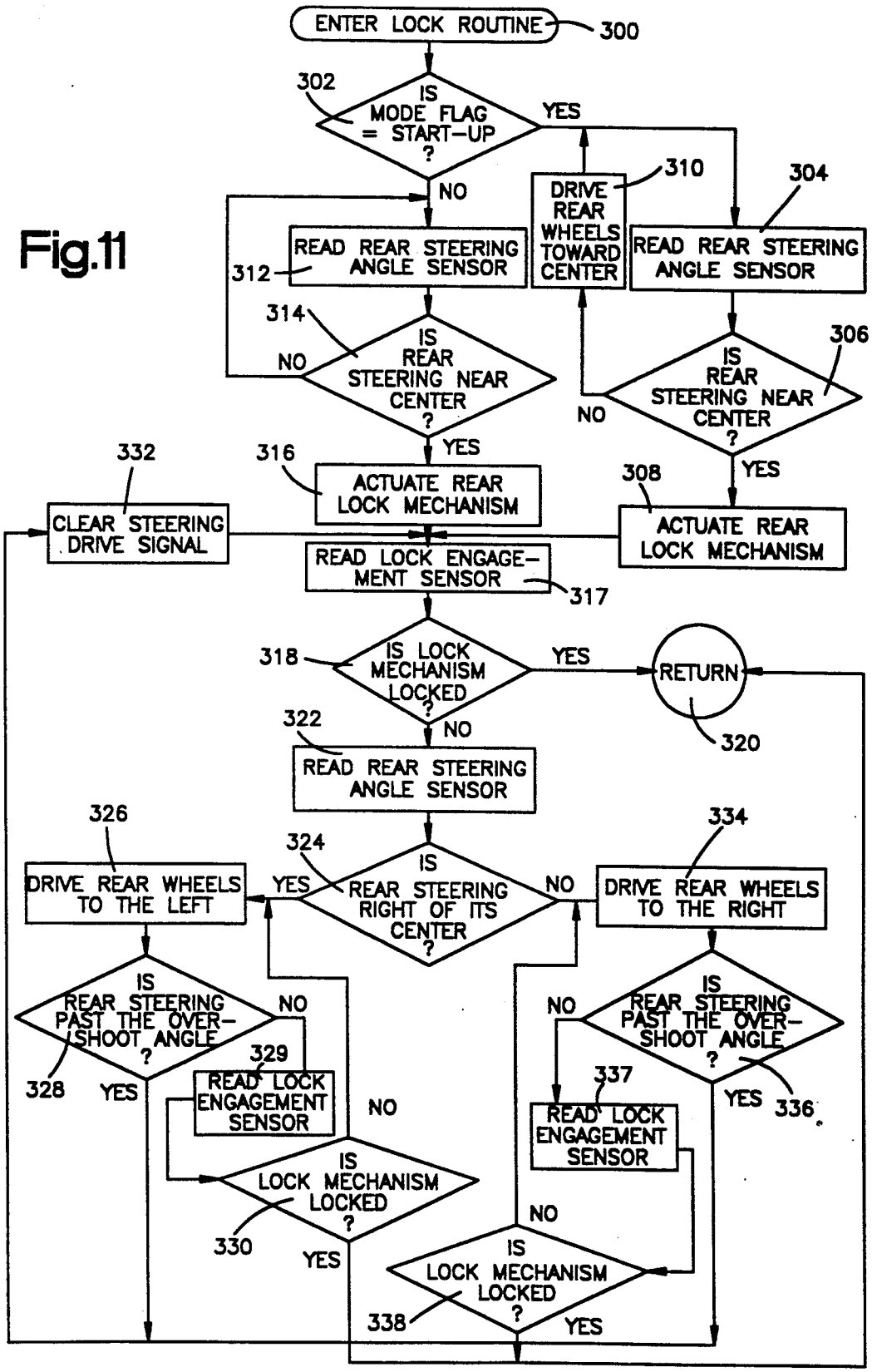
FIG. 11 is a flow chart showing the control procedure the microcomputer of FIG. 1 follows to accomplish a rear wheel lock condition.

Referring to FIG. 11, the procedure the microcomputer follows for locking the rear steerable wheels 42, 44, in accordance with the present invention, will be appreciated. The lock procedure shown in FIG. 11 is a subroutine of the mode selection program illustrated in FIGS. 10A–10C. Referring to FIG. 11, the lock program begins at step 300 whenever the rear wheels 42, 44 are to be locked such as in step 208 shown in FIG. 10A. In step 302, a determination is made as to whether the mode flag M is set to the start-up mode. If the determination in step 302 is affirmative, the program proceeds to step 304. In step 304, the microcomputer 64 reads the rear steering angle sensor 56. The program then proceeds to step 306 where a determination is made as to whether the rear steering angle is near its center position, i.e., near the straight-ahead direction. A near-centered position, in accordance with a preferred embodiment of the present invention, is ±5° of center. If the determination in step 306 is affirmative, the program proceeds to step 308. In step 308, the rear wheel lock mechanism 58 is actuated in an attempt to lock the rear wheels 42, 44 in the straight-ahead direction. Since the rear wheels 42, 44 are within ±5° center when the lock mechanism 58 is actuated, the lock mechanism will bias pin 116 toward the block 124 but the pin will, most likely, not be received in the groove 129 because of non-alignment of pin and groove.

If the determination in step 306 is negative, the program proceeds to step 310. In step 310, the rear steerable wheels 42, 44 are driven toward the center, i.e., the straight-ahead direction, by the use of the steering motors 46, 48 under control of the microcomputer 64 through the hydrostatic steering unit 50. The program then loops back through step 304 and step 306 to determine if the rear steerable wheels 42, 44 are near the center position. The program continues to loop through steps 304, 306 and 310 until the rear wheels 42, 44 are near the straight-ahead direction, at which time the program proceeds to step 308 to actuate the lock mechanism 58.

If the determination in step 302 is negative, the program proceeds to step 312. In step 312, the microcomputer 64 reads the rear steering angle sensor 56. The program then proceeds to step 314 where a determination is made as to whether the rear wheels 42, 44 are near center, i.e., near the straight-ahead direction. Again, a near center position is within ±5° of center. If the determination in step 314 is negative, the program loops back to step 312 to read the rear steering angle sensor 56. The program continues to loop through steps 312 and 314 until the rear steerable wheels 42, 44 are near the straight-ahead direction. In this loop, the rear wheels 42, 44 are continued to be driven in the then present steering mode. When the determination in step 314 is affirmative, the program proceeds to step 316. In step 316, the lock mechanism 58 is actuated in an attempt to lock the rear wheels 42, 44 in the straight-ahead direction. The program proceeds to step 317 from either step 308 or step 316.

In step 317, the microcomputer 64 reads the lock engagement sensor 62. The program then proceeds to step 318. In step 318, a determination is made as to whether the lock mechanism 58 is locked. Even though the lock mechanism 58 is actuated, the rear steerable wheels 42, 44 are initially at an angle that prevents pin 116 from being received fully in the groove 129, the pin remaining outside of the groove in a manner as shown in FIG. 9. The pin 116 must be fully received in the groove before the switch 62 will indicate the rear wheels 42, 44 are locked in the straight-ahead direction. If the determination in step 318 is affirmative, the program proceeds to step 320 which returns to the program shown in FIGS. 10A-10C. If the determination in step 318 is in the negative, the program proceeds to step 322. In step 322, the microcomputer 64 reads the rear steering angle sensor 56. The program then proceeds to step 324.

In step 324, a determination is made as to whether the rear steerable wheels 42, 44 are right of center. If the determination in step 324 is affirmative, the program proceeds to step 326. In step 326, the microcomputer 64 provides the control signal 55 to actuate the steering motors 46, 48 to drive the rear steerable wheels 42, 44 toward the left.

The program then proceeds to step 328 in which a determination is made as to whether the rear steering, i.e., position of the rear steerable wheels 42, 44, is past an overshoot angle. The value of the overshoot angle is a constant value and is stored in the memory 74. In a similar manner as described above with regard to entry of other data, the value of the overshoot angle can be entered via the input device 71 upon prompting in step 185. Alternatively, the value of the overshoot angle can be preprogrammed in the microcomputer. If the determination in step 328 is negative, the program proceeds to step 329. In step 329, the microcomputer 64 reads the lock engagement sensor 62. The program then proceeds to step 330. In step 330, a determination is made as to whether the lock mechanism 58 is locked. If the determination in step 330 is in the negative, the program returns to step 326.

The steering drive control signal 55 continues driving the rear wheels 42, 44 toward the left. If the determination in step 328 is affirmative which means the rear steerable wheels 42, 44 have gone past the centered position or straight-ahead direction, the program proceeds to step 332 which removes the steering drive signal 55. The removal of the steering drive signal 55 is necessary to stop further steering movement of the rear steerable wheels 42, 44 because the rear wheels have already overshot the straight-ahead direction. The program then proceeds back to step 317. If the determination in step 330 is affirmative, the drive signal is removed and the program proceeds to step 320 which returns to the mode selection program shown in FIGS. 10A-10C. When the program returns to the steering mode selection program shown in FIGS. 10A-10C, the rear steerable wheels 42, 44 are locked in the straight-ahead direction.

If the determination in step 324 is negative, the program proceeds to step 334. In step 334, the microcomputer 64 provides the signal 55 to actuate the steering motors 46, 48 to drive the rear wheels 42, 44 toward the right. The program then proceeds to step 336 in which a determination is made as to whether or not the rear steerable wheels 42, 44 have passed an overshoot angle which is stored in the memory 74.

If the determination in step 336 is negative, the program proceeds to step 337. In step 337, the microcomputer 64 reads the lock engagement sensor 62. The program then proceeds to step 338. In step 338, a determination is made as to whether the lock mechanism 58 is locked. If the determination in step 338 is negative, the program returns to step 334. The microcomputer 64 continues to provide the signal 55 so as to continue driving the rear wheels 42, 44 toward the right. If the determination in step 336 is affirmative, the program proceeds to step 332 where the steering signal 55 is removed. The removal of the steering drive signal 55 is necessary to stop further steering movement of the rear steerable wheels 42, 44 because they overshot the straight-ahead direction. If the determination in step 338 is affirmative, the drive signal is removed and the program proceeds to step 320 at which time the program returns to the steering mode selection program shown in FIGS. 10A-10C.

It will be appreciated that during the lock routine, the lock mechanism 58 is biased toward the lock position when the rear wheels 42, 44 are within ±5° of the center position. When the rear wheels 42, 44 are in the center position, the groove 129 captures the pin 116 which is biased toward the groove 129 by the spring 154. It will also be appreciated that, during the lock routine, assuming the mode flag is not set to start-up, the rear wheels are not driven toward the straight-ahead direction until they are sensed to be within ±5°. If the mode flag is in the start-up mode, the rear wheels will be driven toward the straight-ahead direction if they are not already there.

Figure 12:
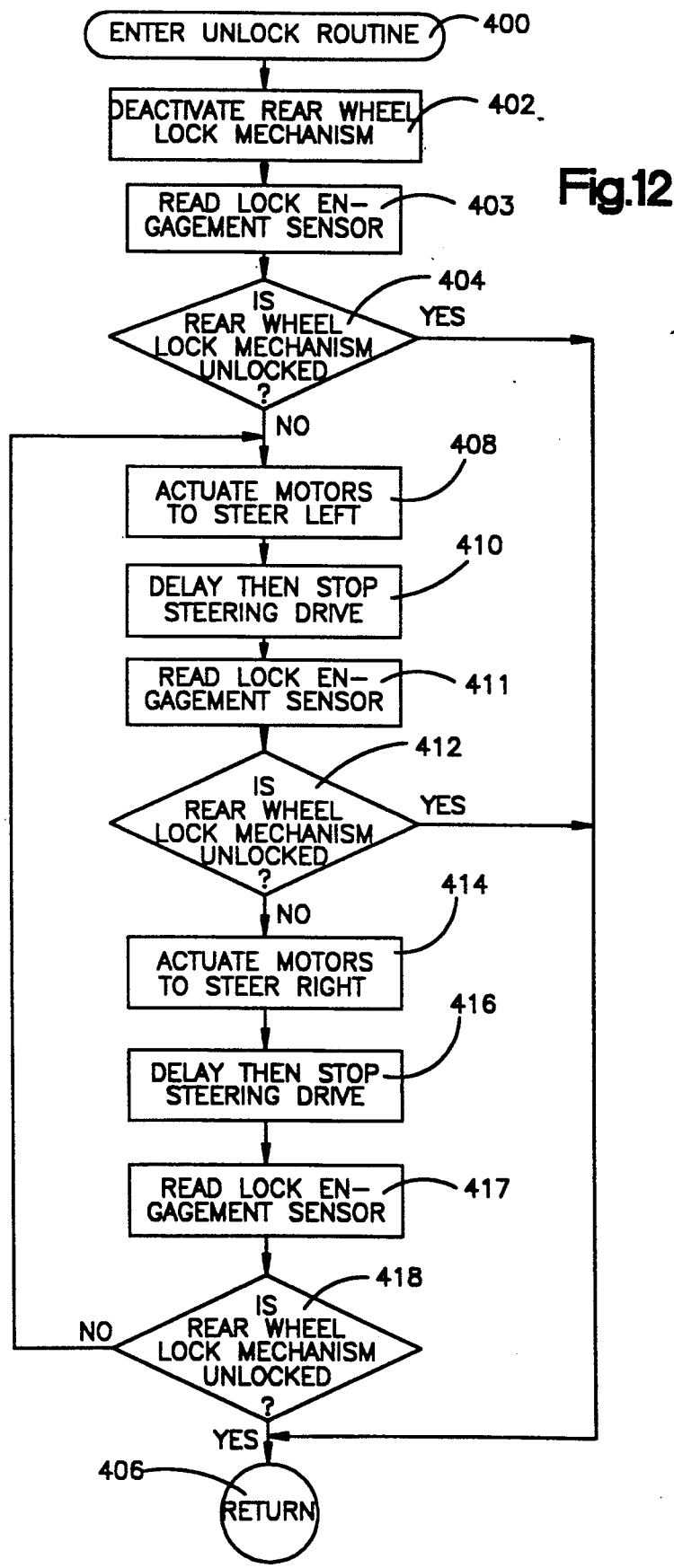
FIG. 12 is a flow chart showing the control procedure the mircocomputer of FIG. 1 follows to accomplish a rear wheel unlock condition.

Referring to FIG. 12, the procedure the microcomputer follows for unlocking the rear steerable wheels 42, 44 in accordance with the present invention, will be appreciated. The unlock procedure shown in FIG. 12 is a subroutine of the mode selection program illustrated in FIGS. 10A–10C. Referring to FIG. 12, the program is entered at step 400. The program proceeds to step 402 in which the lock mechanism 58 is deactuated so as to unlock the rear wheels 42, 44 and allow them to be steered. The program then proceeds to step 403 where the microcomputer 64 reads the lock engagement sensor 62. The program then proceeds to step 404. In step 404, a determination is made as to whether the lock mechanism 58 is unlocked. The lock mechanism 58 may be biased toward an unlocked position, but mud or ice may keep the pin 116 from being removed from the groove 129. If the determination in step 404 is affirmative, the program proceeds to step 406 at which time the program returns to the steering mode selection program shown in FIGS. 10A–10C. If the determination in step 404 is negative, the program proceeds to step 408.

In step 408, the microcomputer 64 provides the control signal 55 so as to actuate the steering motors 46, 48 to drive the rear steerable wheels 42, 44 toward the left. Because pin 116 would still be in groove 129, the wheels 42, 44 do not turn, but torque is applied to pin 116. The program then proceeds to step 410. After a predetermined time delay, the signal 55 for driving the rear steerable wheels 42, 44 toward the left is removed in step 410. The program then proceeds to step 411. In step 411, the microcomputer 64 reads the lock engagement sensor 62. The program then proceeds to step 412.

In step 412, a determination is made as to whether the lock mechanism 58 is unlocked. If the determination in step 412 is affirmative, the program proceeds to step 406 at which time the program returns to the main program, i.e., the steering mode selection program shown in FIGS. 10A–10C. If the determination in step 412 is in the negative, the program proceeds to step 414.

In step 414, the microcomputer 64 provides the signal 55 so as to actuate the steering motors 46, 48 to drive the rear wheels 42, 44 toward the right. Again, since the pin 116 would still be in groove 129, the wheels 42, 44 do not turn, but torque is applied to pin 116; this time, in a direction opposite from that which resulted from step 408. The program then proceeds to step 416. After a predetermined time delay, the signal 55 to steer the rear wheels 42, 44 to the right is removed. The program then proceeds to step 417. In step 417, the microcomputer 64 reads the lock engagement sensor 62. The program then proceeds to step 418.

In step 418, a determination is made as to whether the lock mechanism 58 is unlocked. If the determination in step 418 is affirmative, the program proceeds to step 406 at which time the program returns to the steering mode selection mode program shown in FIGS. 10A–10C. If the determination in step 418 is negative, the program returns to step 408. The program continues to cycle through the loop just described until the lock mechanism 58 is determined to be unlocked in step 412 or 418. When the lock mechanism 58 is sensed to be unlocked, the program proceeds to step 406 wherein it returns to the steering mode selection program shown in FIGS. 10A–10C.

The purpose of steps 404 through 418 of the unlock procedure shown in FIG. 12 is to provide a dithering action so as to free the pin 116 from groove 129. This dithering action may be necessary if, for example, mud or ice prevents removal of the pin 116 from groove 129 under normal operation.

Figure 13:
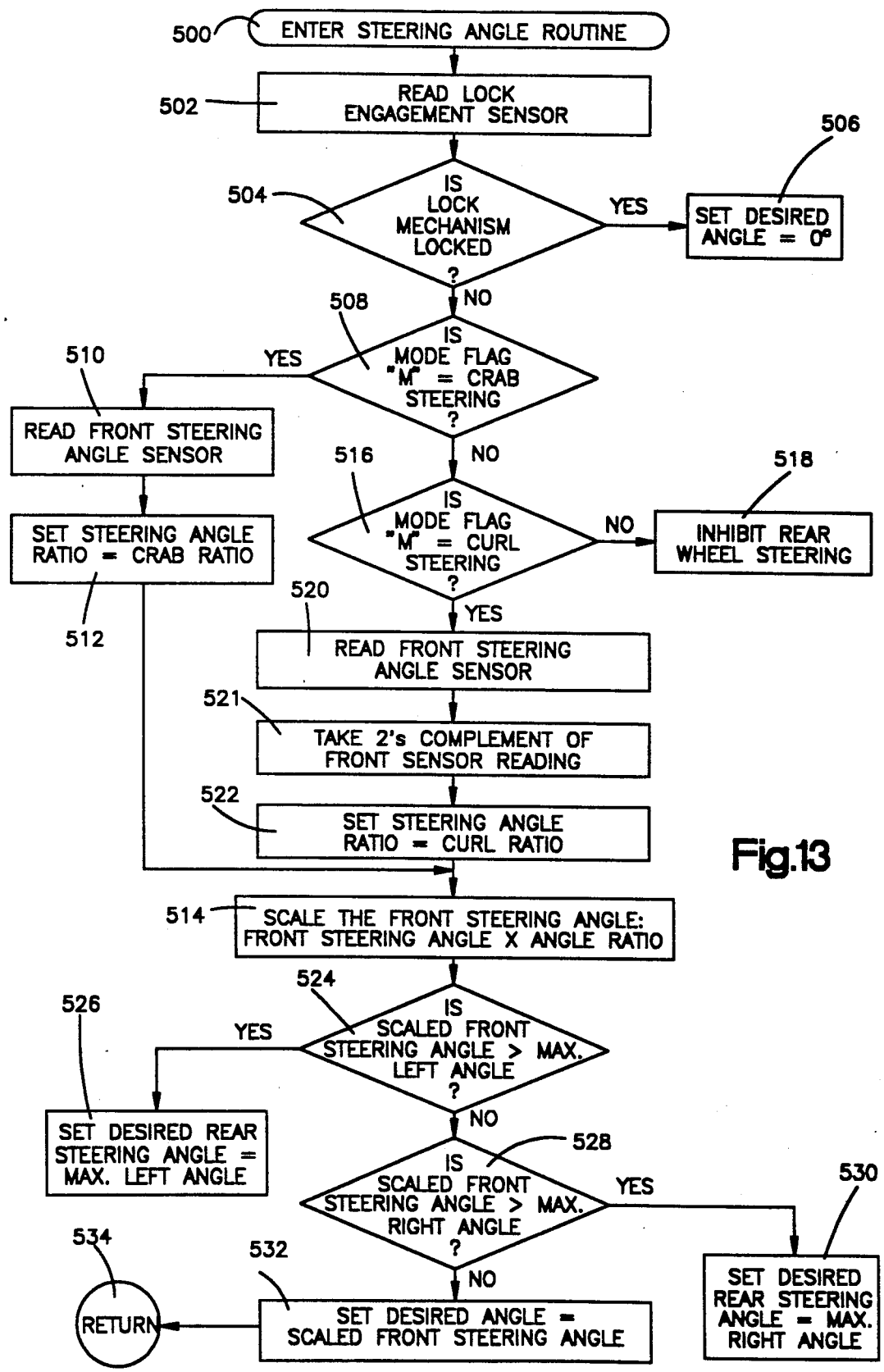
FIG. 13 is a flow chart showing the control procedure the microcomputer of FIG. 1 follows to accomplish steering angle control of the rear steerable wheels.

Referring to FIG. 13, the process for controlling the steering angle of the rear steerable wheels 42, 44 is shown. The microcomputer 64 follows this process and provides an appropriate control signal 55 in accordance with this procedure. The rear steering angle control routine begins at step 500. The routine proceeds to step 502 where the microcomputer 64 reads the lock engagement sensor 62. The program then proceeds to step 504. In step 504, a determination is made as to whether the lock mechanism 58 is locked. If the determination in step 504 is affirmative, the desired steering angle for the rear rear steerable wheels 42, 44 is set to zero degrees in step 506. The program then returns to the mode selection program shown in FIGS. 10A–10C. If the determination in step 504 is negative, the program proceeds to step 508.

In step 508, a determination is made as to whether the mode flag M is set to the crab steering mode. If the determination in step 508 is affirmative, then the program proceeds to step 510. In step 510, the microcomputer 64 reads the front steering angle sensor 32. The program then proceeds to step 512 in which the angle ratio between the front steerable wheels 14, 16 and the rear steerable wheels 42, 44 is set equal to the crab ratio. The value of the crab ratio, i.e., the ratio of rear steering angle to front steering angle, is either preprogrammed into the memory 74 or is entered during prompting in step 185. In accordance with a preferred embodiment, the crab ratio is of one-to-one. After the steering angle ratio is set equal to the crab ratio, the program proceeds to step 514.

If the determination in step 508 was is negative, the program proceeds to step 516. In step 516, a determination is made as to whether the mode flag M is set to the curl steering mode. If the determination in step 516 is negative, the program proceeds to step 518 in which rear wheel steering is inhibited, i.e., the microcomputer 64 does not provide a control signal 55 that would result in actuation of the steering motors 46, 48. When rear steering is inhibited, the steering mode defaults to the front wheel only steering mode. An error message would then be generated and the program would return to the mode selection program.

If the determination in step 516 is affirmative, the program proceeds to step 520. In step 520, the microcomputer 64 reads the front steering angle sensor 32. The program then proceeds to step 521 where the two's complement is taken of the output of the front steering angle sensor. This step, in effect, reverses the reading of the front steering angle sensor. The program then proceeds to step 522 in which the steering angle ratio is set equal to the curl ratio. The curl ratio value is either preprogrammed and stored in the memory 74 or is entered during prompting in step 185. In a preferred embodiment, the curl ratio is one-to-one. The program then proceeds to step 514.

In step 514, the front steering angle is scaled. The scaled value of the front steering angle is equal to the product of the front steering angle times the angle ratio. The angle ratio will be the crab ratio if step 514 was entered from step 512 and will be the curl ratio if step 514 was entered from step 522. Scaling in step 514 is necessary when the ratios are not one-to-one. The program then proceeds to step 524. In step 524, a determination is made as to whether the front steering angle is greater than a predetermined maximum allowable left rear steering angle. The maximum allowable left rear steering angle is a predetermined value stored in the memory 74 either as preprogrammed data or entered during prompting in step 185. If the determination in step 524 is affirmative, the program proceeds to step 526. In step 526, the desired rear steering angle is set equal to the maximum allowable left rear steering angle. The program then returns to the main program shown in FIGS. 10A-10C. The rear steerable wheels 42, 44 will be turned toward the left, when required, and only so far as the set desired maximum left rear steering angle.

If the determination in step 524 is negative, the program proceeds to step 528. In step 528, a determination is made as to whether the scaled front steering angle is greater than a predetermined maximum allowable right rear steering angle. The maximum allowable right rear steering angle is stored in the memory 74 either as preprogrammed data or entered during prompting in step 185. If the determination in step 528 is affirmative, the program proceeds to step 530. In step 530, the desired rear steering angle is set equal to the maximum allowable right steering angle. The program then returns to the main program shown in FIGS. 10A-10C. The rear steerable wheels 42, 44 will be turned toward the right when required, and only so far as the set desired maximum right rear steering angle. If the determination in step 528 is negative, the program proceeds to step 532. In step 532, the desired rear steering angle is set equal to the scaled front steering angle. The program then proceeds to step 534 in which it returns to the steering mode selection program shown in FIGS. 10A-10C. The rear wheels will be steered in accordance with the desired steering angle set in step 532 but not to exceed limits set in steps 526 and 530.

This invention has been described with reference to a preferred embodiment. Modifications and alterations may become apparent to those skilled in the art upon reading and understanding the specification. For example, the invention has been described with regard to the use of a hydraulic steering motor for the front steering assembly 13 and, also, with regard to the use of hydraulic steering motors for the rear steering assembly 40. It will be appreciated that the present invention could be used in combination with electric assist motors for both the front and rear steering assemblies. If a different hydraulic steering assembly or electric assist motor is used in the rear steering assembly, it would be controlled by the output signal 55 from the microcomputer 64. It is my intention to include all such modifications and alterations insofar as they come within the scope of the appended claims or the equivalents thereof.

Having described a preferred embodiment of the invention, we claim:

1. An apparatus for locking a rear set of steerable wheels of a vehicle in a straight-ahead direction, the vehicle having a front set of steerable wheels and a rear set of steerable wheels, said apparatus comprising:

means for sensing an angular steering direction of the rear set of steerable wheels relative to a straight-ahead direction and providing a signal indicative thereof;

actuatable locking means operatively connected to a frame of the vehicle and the rear set of steerable wheels for, when actuated and when the rear set of steerable wheels is in the straight-ahead direction, locking the rear set of steerable wheels in the straight-ahead direction; and control means operatively connected to said sensing means and to said locking means for actuating said locking means in response to a control signal only when the rear set of steerable wheels are sensed to be within a predetermined angle of the straight-ahead direction.

2. The apparatus of claim 1 further including lock sensing means for sensing if said locking means has locked the rear set of steerable wheels in the straight-ahead direction and for providing a signal indicative thereof, and drive means controlled by said control means for steerably moving the rear set of steerable wheels toward the straight-ahead direction when said control means actuates said locking means and said signal from said lock sensing means indicates said locking means has not locked the rear set of steerable wheels to the vehicle frame.

3. The apparatus of claim 2 wherein said control means reverses said drive means if the rear set of steerable wheels are sensed to have been driven past the straight-ahead direction and said signal from said lock sensing means indicates said locking means has not locked the rear set of steerable wheels in the straight-ahead direction.

4. The apparatus of claim 1 wherein said locking means includes a lock actuator mounted to a pivotal portion of the rear steerable wheels, said lock actuator including a slidable locking pin, said lock actuator sliding said locking pin outward when actuated thereby extending the locking pin and sliding said locking pin inward when unactuated, a latching block secured to a frame of the vehicle and including a locking pin receiving groove for, when said locking pin is extended and the rear steerable wheels are in a straight ahead direction, receiving said locking pin so as to maintain the rear steerable wheels in the straight-ahead direction.

5. The apparatus of claim 4 wherein said locking means further includes spring bias means which, upon actuation of said lock actuator, applies a bias force to said locking pin in a direction to extend the locking pin.

6. The apparatus of claim 4 wherein said lock actuator further includes an electric motor and a rotary-to-linear motion converter.

7. The apparatus of claim 4 wherein said locking means further includes a locking pin position sensor for, when said locking pin is received in said locking pin receiving groove of the latching block, providing a first electrical signal, or when said locking pin is not received in said locking pin receiving groove of the latching block, providing a second electrical signal.

8. An apparatus for locking a rear set of steerable wheels in a straight-ahead direction and for unlocking the rear set of steerable wheels in a vehicle having a front set of steerable wheels and a rear set of steerable wheels, said apparatus comprising:

actuatable locking means operatively connected to the rear set of steerable wheels and the vehicle frame for, when actuated and when said rear set of steerable wheels is in a straight-ahead direction, locking the rear set of steerable wheels in the straight-ahead direction;

lock sensing means for sensing if the rear set of steerable wheels are locked or unlocked and for providing signals indicative thereof;

means for steerably moving the rear set of steerable wheels both left and right of the straight-ahead direction; and control means operatively connected to said steerable moving means, to said lock sensing means, and to said actuatable locking means for providing a first signal to actuate said locking means in response to a first control signal and providing a second signal to unlock the rear set of steerable wheels in response to a second control signal, said control means, if after providing said second signal to unlock the rear set of steerable wheels and sensing the rear set of steerable wheels are not unlocked, controlling said steerable moving means so as to attempt to drive the rear set of steerable wheels away from the straight-ahead direction for a predetermined time period.

9. An apparatus for locking a steerable wheel of a vehicle in a predetermined direction comprising:

actuatable locking means mounted to one of a pivotal portion of the steerable wheel of the vehicle or a frame of the vehicle and actuatable in response to a control signal, said actuatable locking means having a slidable locking pin with a tapered end, said actuatable locking means sliding said locking pin outward when actuated by the control signal so as to extend said locking pin;

a latching block mounted to the other of the vehicle frame or the pivotal portion of the steerable wheel of the vehicle, said latching block having a locking pin receiving groove with a tapered opening for, when said locking pin is extended and the steerable wheel is in the predetermined direction, receiving said locking pin so as to maintain the steerable wheel in said predetermined direction whereby said tapered end of said pin and said tapered opening of said groove prevent pin binding; and means for providing said control signal when it is desired to lock the steerable wheel in the predetermined direction.

10. The apparatus of claim 9 wherein said actuatable locking means includes an electric motor, a rotary-to-linear motion converter operatively connected to an output shaft of the electric motor and having a member extending therefrom that is driven in linear motion upon rotation of the motor output shaft, a locking pin housing mounted to one of the pivotal portion of the steerable wheel of the vehicle or a frame of the vehicle, said electric motor and said rotary-to-linear motion converter mounted to said locking pin housing, said locking pin housing having a pin receiving bore for slidably holding said locking pin, said extending member of said rotary-to-linear motion converter operatively connected to said locking pin so that linear motion of said extending member slides said locking pin.

11. The apparatus of claim 9 further including means for sensing the position of said locking pin and for providing one electrical signal when said locking pin is extended and for providing a second electrical signal when said locking pin is not extended.

* * * * *